(12) United States Patent
McKenna et al.

(10) Patent No.: US 8,307,035 B2
(45) Date of Patent: *Nov. 6, 2012

(54) VIRTUAL AGGREGATION PROCESSOR FOR INCORPORATING REVERSE PATH FEEDBACK INTO CONTENT DELIVERED ON A FORWARD PATH

(75) Inventors: Daniel Bernard McKenna, Vail, CO (US); James Michael Graziano, Hotchkiss, CO (US)

(73) Assignee: Lava Two, LLC, Vail, CO (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/675,376

(22) PCT Filed: Aug. 31, 2007

(86) PCT No.: PCT/US2007/077382
§ 371 (c)(1),
(2), (4) Date: Feb. 25, 2010

(87) PCT Pub. No.: WO2009/029105
PCT Pub. Date: Mar. 5, 2009

(65) Prior Publication Data
US 2011/0066747 A1    Mar. 17, 2011

(51) Int. Cl.
*G06F 15/16* (2006.01)
*B41L 5/05* (2006.01)
(52) U.S. Cl. ......................... 709/205; 462/42
(58) Field of Classification Search .................. 709/205
See application file for complete search history.

(56) References Cited

U.S. PATENT DOCUMENTS

| | | |
|---|---|---|
| 5,697,844 A | 12/1997 | Von Kohorn |
| 6,298,482 B1 * | 10/2001 | Seidman et al. ............... 725/101 |
| 6,447,396 B1 | 9/2002 | Galyean, III et al. |
| 6,594,498 B1 | 7/2003 | McKenna et al. |
| 6,681,115 B1 | 1/2004 | McKenna et al. |
| 6,874,029 B2 * | 3/2005 | Hutcheson et al. ........... 709/227 |
| 6,954,641 B2 | 10/2005 | McKenna et al. |
| 7,455,591 B2 * | 11/2008 | Nguyen .......................... 463/42 |
| 7,480,727 B2 | 1/2009 | Domschitz |
| 7,546,118 B2 | 6/2009 | Camp, Jr. |

(Continued)

FOREIGN PATENT DOCUMENTS
WO    WO-2004084444 A1    9/2004

OTHER PUBLICATIONS

International Search Report in PCT Application Serial No. PCT/US07/077382 dated Apr. 15, 2008, 4 pages.

(Continued)

*Primary Examiner* — Asghar Bilgrami
(74) *Attorney, Agent, or Firm* — Patton Boggs LLP (57) ABSTRACT

The Virtual Aggregation Processor enables end user devices to share a common wireless forward path of a multicast communication architecture in which the forward path delivered content is dynamically changed or modified based on a real-time, near-real-time, or delay-time basis via aggregated reverse path feedback from at least one of a plurality of end user devices. The Virtual Aggregation Processor periodically or continuously aggregates the feedback input received via the reverse path (having wired and/or wireless connectivity), modifies the forward path multi-media content, and delivers this dynamically modified multi-media content to the then connected population of end user devices via a wireless forward path multicast in a repetitive closed loop fashion.

10 Claims, 5 Drawing Sheets

U.S. PATENT DOCUMENTS

| | | | |
|---|---|---|---|
| 7,830,388 B1 * | 11/2010 | Lu | 345/501 |
| 2002/0034980 A1 | 3/2002 | Lemmons et al. | |
| 2002/0143901 A1 | 10/2002 | Lupo et al. | |
| 2003/0018970 A1 | 1/2003 | McKenna | |
| 2003/0163482 A1 | 8/2003 | Bunney et al. | |
| 2003/0177187 A1 * | 9/2003 | Levine et al. | 709/205 |
| 2003/0208613 A1 | 11/2003 | Signes et al. | |
| 2004/0002049 A1 | 1/2004 | Beavers et al. | |
| 2004/0031052 A1 | 2/2004 | Wannamaker et al. | |
| 2005/0010653 A1 | 1/2005 | McCanne | |
| 2005/0027648 A1 | 2/2005 | Knowles et al. | |
| 2005/0039210 A1 | 2/2005 | Dusenberry et al. | |
| 2006/0080360 A1 | 4/2006 | Young et al. | |
| 2006/0099981 A1 | 5/2006 | McKenna et al. | |
| 2006/0248013 A1 | 11/2006 | Ebert et al. | |
| 2006/0253601 A1 | 11/2006 | Vedantham et al. | |
| 2006/0259469 A1 | 11/2006 | Chiu | |
| 2007/0099704 A1 * | 5/2007 | Liu et al. | 463/42 |
| 2007/0113179 A1 | 5/2007 | Gibbs et al. | |
| 2007/0168490 A1 | 7/2007 | Kent et al. | |
| 2007/0174887 A1 | 7/2007 | Hu et al. | |
| 2007/0260984 A1 * | 11/2007 | Marks et al. | 715/706 |
| 2008/0052624 A1 * | 2/2008 | Roberts et al. | 715/716 |
| 2008/0123822 A1 * | 5/2008 | Sapp et al. | 379/68 |
| 2009/0083431 A1 * | 3/2009 | Balachandran et al. | 709/228 |
| 2009/0118017 A1 * | 5/2009 | Perlman et al. | 463/42 |
| 2011/0107220 A1 * | 5/2011 | Perlman | 715/720 |
| 2011/0188415 A1 * | 8/2011 | Graziano | 370/310 |

OTHER PUBLICATIONS

International Search Report in PCT Application Serial No. PCT/US07/077395 dated Sep. 17, 2008, 4 pages.

International Search Report in PCT Application Serial No. PCT/US07/077405 dated Apr. 23, 2008, 4 pages.

International Search Report in PCT Application Serial No. PCT/US07/077409 dated Apr. 18, 2008, 4 pages.

International Search Report in PCT Application Serial No. PCT/US07/077417 dated Apr. 1, 2008, 3 pages.

International Search Report in PCT Application Serial No. PCT/US07/077421 dated Mar. 14, 2008, 4 pages.

International Search Report in PCT Application Serial No. PCT/US07/077425 dated Mar. 17, 2008, 4 pages.

* cited by examiner

Fig. 2

VIRTUAL AGGREGATION PROCESSOR FOR INCORPORATING REVERSE PATH FEEDBACK INTO CONTENT DELIVERED ON A FORWARD PATH

CROSS-REFERENCE TO RELATED APPLICATIONS

This application is a national stage of PCT Patent Application No. PCT/US07/077,382 filed Aug. 31, 2007, and is hereby incorporated by reference to the same extent as though fully disclosed herein. This application also is related to applications titled "Transaction Management System In A Multicast Or Broadcast Wireless Communication Network" filed concurrently herewith; "Forward Path Multi-Media Management System With End User Feedback To Central Content Sources" filed concurrently herewith; "Forward Path Multi-Media Management System With End User Feedback To Distributed Content Sources" filed concurrently herewith; "Communication Network For A Multi-Media Management System With End User Feedback" filed concurrently herewith; "Gaming System With End User Feedback For A Communication Network Having A Multi-Media Management" filed concurrently herewith; and "Gaming Device For Multi-Player Games", filed concurrently herewith.

FIELD OF THE INVENTION

This invention relates to a virtual aggregation processor operable in a Forward Path Multi-Media Management System which enables feedback via the reverse path (end user device to network direction) from at least one of a plurality of end users who are capable of influencing, modifying, or changing the delivered multi-media content in the forward path (network to end user device direction) being delivered via a wireless multicast communication network.

BACKGROUND OF THE INVENTION

Multi-media content such as video, music, or data is delivered in a well known fashion via wired or wireless networks to end user devices such as HDTVs, music play-back systems, or portable mobile devices. The multi-media content delivery network could be via satellite, cable, DSL, internet, WiFi, cellular, MediaFLO, WiMax, and so on. These networks have unique characteristics of speed, efficiency, reliability, availability, and capacity. For example, satellite is more efficient for large geographic regions but suffers from diminished content distinction from one region to the next; that is, there is minimal content diversity, and it is expensive and difficult to do high granularity regional or demographic content targeting in a satellite architecture. In contrast, cable TV has regional and neighborhood targeting attributes but is often bandwidth or capacity constrained, thereby limiting the number of high bandwidth HDTV signals it can carry, for example.

What is needed is a network architecture that combines the two strengths of cable and satellite—targeting and capacity, respectively. An architectural advantage of wireless terrestrial networks is high capacity and targeted delivery. A terrestrial wireless network can deliver multi-media content to more than one end user or subscriber at the same time, thereby realizing high levels of network efficiency. In addition, terrestrial wireless networks are high bandwidth and high capacity. Thus, a terrestrial wireless network has attributes of both cable TV and satellite—the terrestrial wireless network has high capacity and regional/demographic targeting. The terrestrial wireless network delivery method is called broadcast, multicast, or narrowcast and has at least one end user (subscriber) and associated end user device receiving the broadcasted content, and thereby derives its high efficiency when more than one end user receives the same content in a simultaneous fashion.

Wireless multicast service in a wireless communication network facilitates the sharing of a single air interface channel by multiple end users. The single wireless air interface channel, logical or physical, extends from the base station radio transmitter in the wireless communication network to a subscriber's wireless end user device, wherein the single wireless air interface channel comprises the forward path (network to end user device direction) that carries the multicast multi-media content. A plurality of end user devices thereby concurrently receives the multi-media content on the same forward path channel. While the multicast process is well taught in the art, the delivered multi-media content, information, or data (collectively termed "content" or "multi-media content" herein) is static in nature and is simply a replica of the source content, less any transmission or coding errors. The wirelessly multicast source content is immutable and does not have end user interaction or feedback.

Web 2.0 services strive to engage the subscriber (end user) population in a dynamic fashion with feedback, comments, and so on. This comment or feedback path is to the sub-population of subscribers of a particular interest group and is accomplished in the Internet paradigm, a one-to-one Internet protocol connection. Thus, the classic Internet and even Web 2.0, while realizing high targeting and subscriber feedback, does not achieve high delivery efficiency since the connections are one-to-one in nature.

New wireless multi-media content delivery architectures, such as MediaFLO ("Media ForwardLinkOnly") and DVB-H (Digital Video Broadcast-Handheld), function by using a broadcast architecture in the forward path to produce a pseudo-multicast delivery and concurrently disseminate multi-media content to a plurality of wireless end user devices on a single air interface channel. In these architectures (also termed "multicast" herein), a unidirectional multi-media wireless broadcast network transmits multi-media content to selected authorized wireless end user devices in a time concurrent fashion. However, there is no interconnection, interaction, or feedback between the end users and their associated end user devices with this multicasted multi-media content stream. The forward path content is completely and totally static in its nature. The delivered multi-media content is essentially no different than UHF or VHF broadcasted television, other than it can be received on small portable digital devices.

The MediaFLO and DVB-H multi-media wireless architectures, therefore, are static in their user interface, since there is no interactivity or feedback between delivered multi-media content and the end user. The multicasted content is invariant or immutable in its extent. That is, whatever is delivered to the wireless network for transmission to the end user population is delivered as an exact replica, untouched and unmodified from its original form. This is a distinct and inherent limitation of the present wireless multicasting art (even though multicasting is efficient and targeted).

The present wireless multicasting art does not enable or permit end users, via their associated end user devices, to modify the multi-media content carried on the forward path in any manner. Still, there are numerous applications wherein the ability to modify the forward path multicast content based on end user (subscriber) input or actions would be highly desired. What is needed is a novel adaptation of a wireless multicast network that enables end user interaction and modification of the forward path delivered multi-media content.

In this new architecture, the end user population would have an unprecedented ability to communicate data and knowledge via the reverse path, a capability heretofore unavailable. The scope and diversity of these end user driven applications, while virtually unlimited, include: multi-player gaming, emergency events, education, medicine, live sporting events, automobile traffic congestion reports, and the like. This interactivity could be embodied in numerous forms to include, but not be limited to: opinion polling, purchase processing, public safety, social networking, or any other instance where it would be useful to have the content being delivered on the forward path modified based on end user feedback or interaction.

Thus, the state of the wireless multicasting art does not enable the capability to dynamically modify the content delivered on the forward path via aggregated feedback or input from at least one of a plurality of end users via their associated end user devices. No system heretofore has envisioned engaging the end user to directly and actively influence the delivered multicasted content.

BRIEF SUMMARY OF THE INVENTION

An advance is realized over the present wireless multicasting art with the present Virtual Aggregation Processor for Incorporating Reverse Path Feedback Into Content Delivered On A Forward Path (termed "Virtual Aggregation Processor" herein), which uses a reverse path feedback architecture, wherein the forward path multicasted content can be dynamically modified as a result of end user interaction or feedback over the reverse path.

In the Forward Path Multi-Media Management System architecture, end user devices share a common wireless forward path of a multicast communication architecture in which the forward path delivered content is dynamically changed or modified by the Virtual Aggregation Processor based on a real-time, near-real-time, or delay-time basis via aggregated reverse path feedback from at least one of a plurality of end user devices. The Virtual Aggregation Processor periodically or continuously aggregates the feedback input received via the reverse path (having wired and/or wireless connectivity), modifies the forward path multi-media content, and the Forward Path Multi-Media Management System delivers this dynamically modified multi-media content to the then connected population of end user devices via a wireless forward path multicast in a repetitive closed loop fashion.

The Virtual Aggregation Processor aggregates the reverse path feedback from the end user device or devices and then processes this feedback data in context with the streamed forward path content. For example, if the application is a multi-player game, the Virtual Aggregation Processor receives the end user's reverse path feedback data which defines how their avatar or in-game virtual person should react or behave at a given point within the game. This feedback is sent to the Forward Path Multi-Media Management System via wired or wireless means. The Virtual Aggregation Processor, in this gaming example, aggregates and delivers the "combined feedback" of all the connected end users for that moment in time to the gaming software application. The gaming software application then modifies its streamed forward path content according to the latest "combined feedback". The wireless multicast network then delivers the latest video frames or sequence of successive game image frames of the game session (to include sound) to the participating end users based on the "combined feedback". The wireless multicast can be delivery targeted to regionally or locally grouped end user sub-populations to enhance the overall network efficiency. This process repeats in a continuous fashion, with continuous N+1 events of "combined feedback" delivered to the software application, which in turn modifies the streamed forward path content.

The Forward Path Multi-Media Management System in general relates to any application that has at least one end user but preferably a plurality of end users wherein each end user has periodic reverse path feedback content coupled with a bandwidth intensive forward path data stream from a central source that can concurrently wirelessly deliver the given data stream to all respective sub-populations, each having their own multicast, and in aggregate the Forward Path Multi-Media Management System serves the entire population (thereby realizing substantial networking efficiencies). The number of applications that fit this set of networking attributes is virtually limitless. This is described in substantially more detail in the following figures and specification where the interrelationships and interconnections are examined.

End users in the Forward Path Multi-Media Management System can be grouped via location or region, together with personal attributes such as demographic, socio-graphic, or psychographic interests as it relates to a given multicasted content stream. The pairing of physical location groupings with personal interest attributes enables new and novel telecommunication services with the attendant advantage of extremely efficient delivery. The wireless communication network's capacity utilization, both in terms of assets and spectrum, is very high.

In the Forward Path Multi-Media Management System architecture, the reverse path (end user to network direction) can be wired or wireless. Thus, the reverse path has flexibility in terms of its connectivity as well as the relative speed of its connection. For instance, a computer connected to a home or office LAN can use its personal LAN network for reverse path connectivity to the Forward Path Multi-Media Management System. However, to realize the forward path efficiencies of concurrent delivery of the streamed content, the computer also has the ability to wirelessly receive the concurrent forward path for its sub-population geographic grouping via cellular, WiFi, WiMax, MediaFLO, DVB-H, or some other wireless means. Alternatively, if the reverse path is wireless only, the end user device could use the same network as the forward path stream, such as in a WiFi or WiMax network; or it could be a hybrid of WiFi or cellular in the reverse path and MediaFLO in the forward path. The end user device could be a PC, a PDA, a cell phone, or some specialized device like a video game controller. Thus, the Forward Path Multi-Media Management System architecture is not limited to any one configuration.

The Forward Path Multi-Media Management system solves a complex problem resident in existing telecommunication architectures by combining reverse path feedback with forward path multicasting in numerous novel ways to achieve high delivery efficiency, high subscriber targeting, and continuous content modification ensuring high relevancy. In addition, the forward path delivered content is dynamically changed or modified by the Virtual Aggregation Processor based on a real-time, near-real-time, or delay-time basis via aggregated reverse path feedback from at least one of a plurality of end user devices.

DETAILED DESCRIPTION OF THE INVENTION

Philosophy of the Multicast Wireless Communication System

An exemplary narrowcast technology is described in detail in U.S. Pat. No. 6,594,498 and U.S. Pat. No. 6,681,115, for example; and this technology can be used to implement narrowcast communications to wireless end user devices where the narrowcast is a highly targeted "multicast" to geographic and/or demographic end user groupings. The term "narrowcast" as used in these patents is considered a form of multicasting.

Forward Path Multi-Media Management Philosophy

Figure 1A:
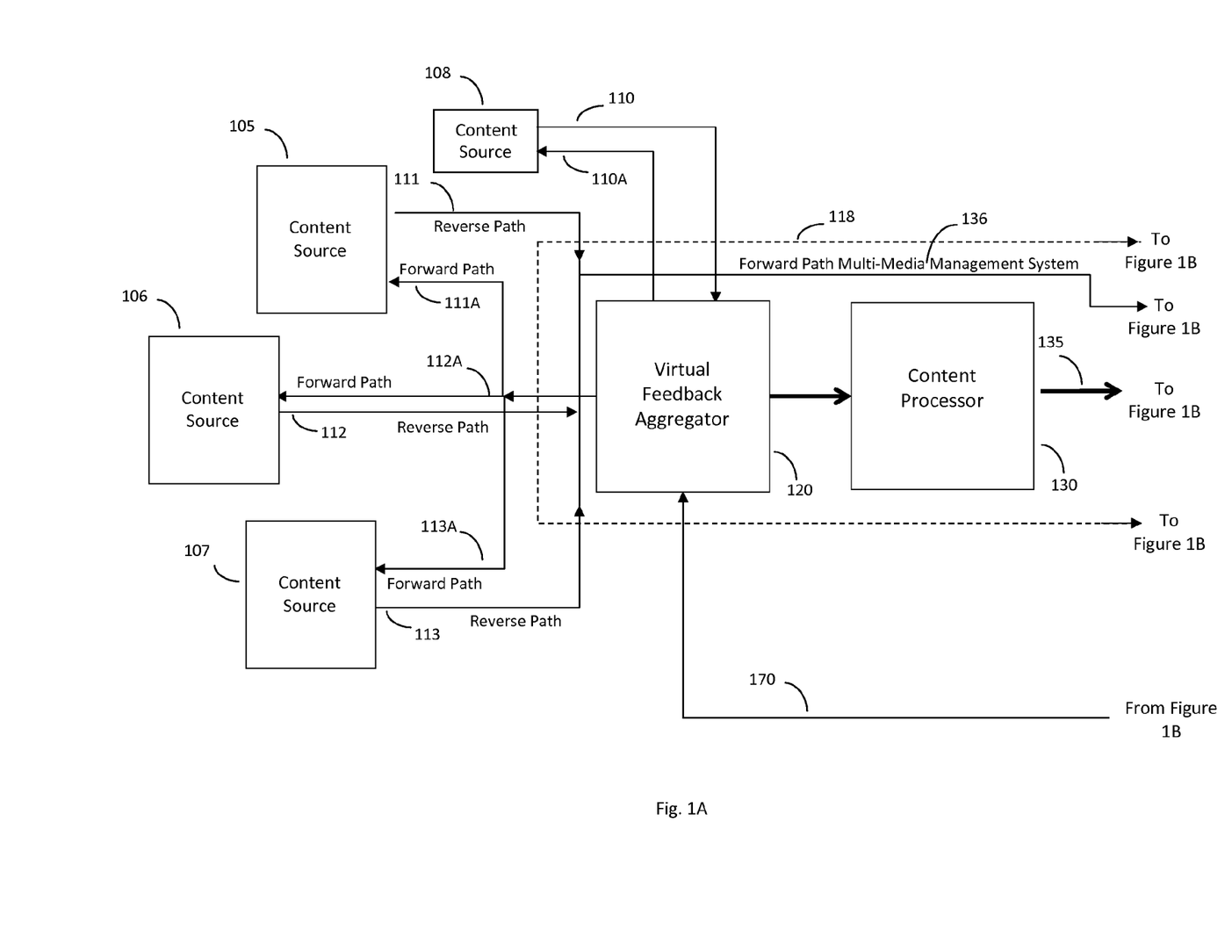
FIGS. 1A and 1B illustrate, in block diagram form, the overall architecture of a typical Forward Path Multi-Media Management System.
Figure 1B:
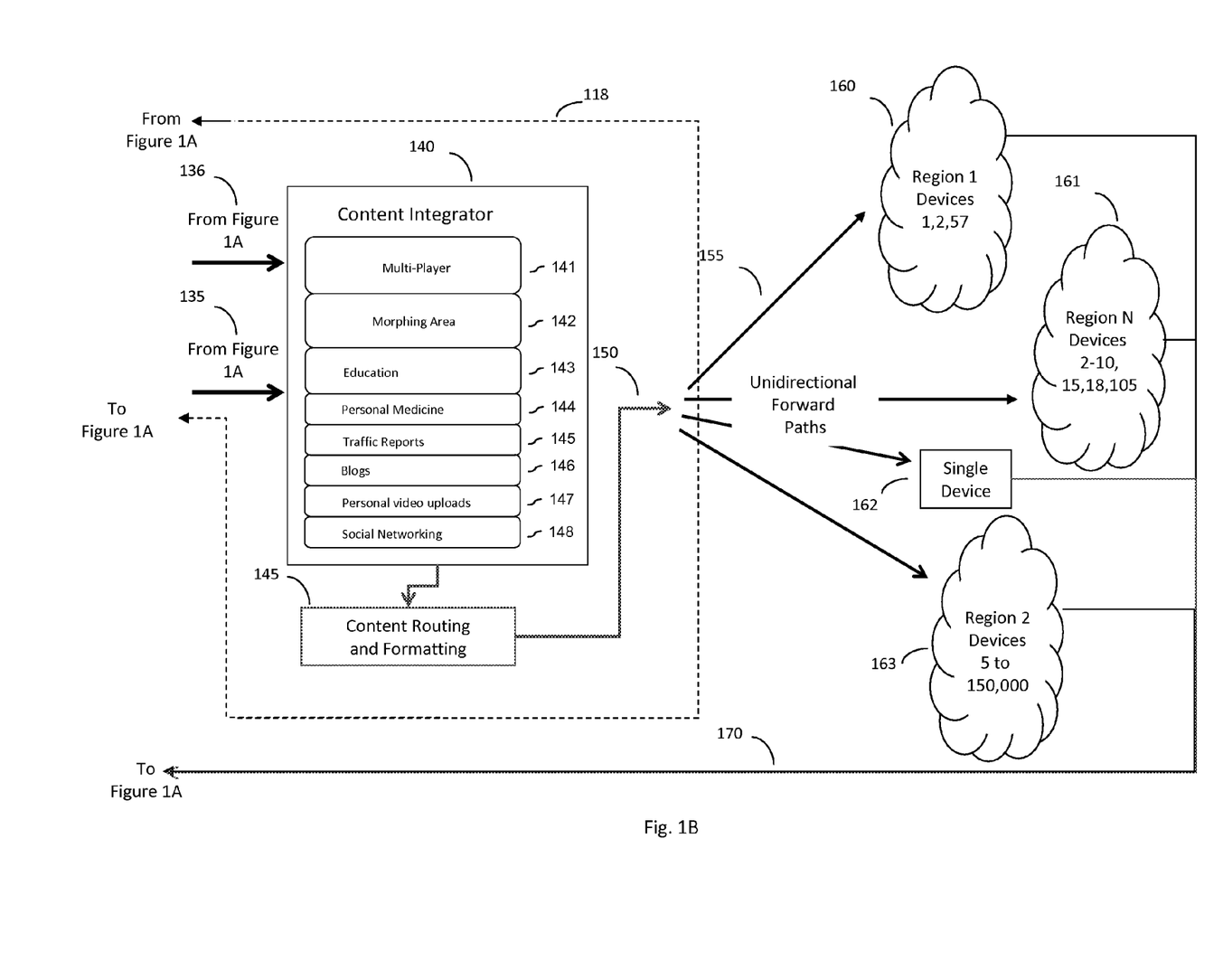
Figure 1C:
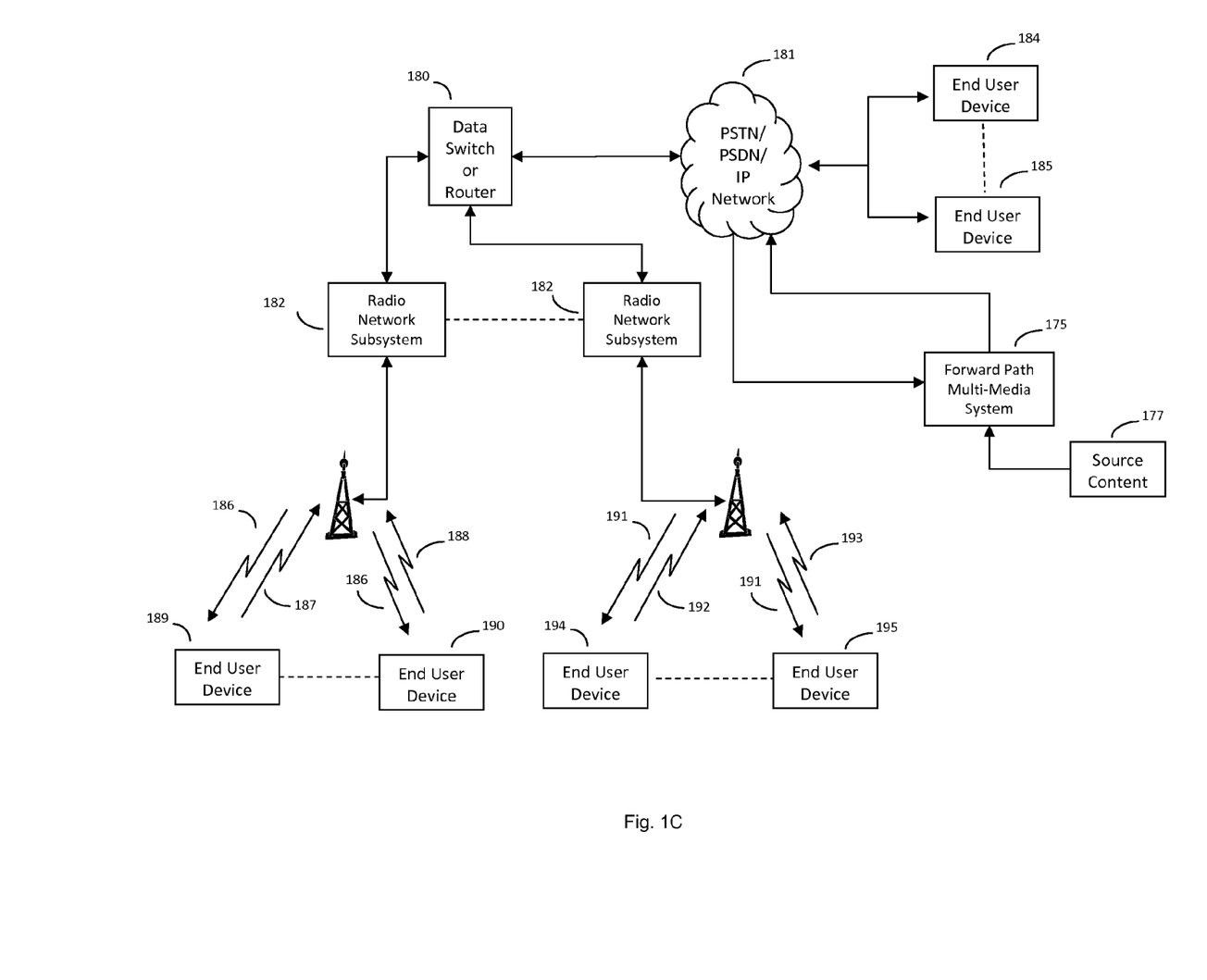
FIG. 1C illustrates an example of a physical wireless network with reverse path modification of the forward path.

The overall architecture of the Forward Path Multi-Media Management System is illustrated in FIGS. 1A and 1B, which depict a logical or functional description of the Forward Path Multi-media Management System architecture and show the essential building blocks of the overall system. One key element of this particular architecture is that the content sources are centrally located. FIGS. 1A and 1B depict a logical or functional description of the Forward Path Multi-Media Management System architecture and show the essential building blocks of the overall system. FIG. 1C illustrates one physical network embodiment of the system of FIGS. 1A and 1B.

Content sources 105-107 are centrally located and typically sources of broadband multi-media programs that are either generated off-line or dynamically generated on-line. The content could be visual or visual/aural in its extent, or it could take some other form such as machine-to-machine data. This content is of interest to one or more grouped sets of end users (subscribers) on the forward path multicast.

End user devices that receive the content can be grouped by region, locale, or geography as sub-populations 160-163 where sub-population 163 is the Nth sub-population. In aggregate, all of the sub-populations form the "population" of end users. While not shown, these sub-populations could also be formed on the basis of end user attributes such as demographic, psychographic, or socio-graphic attributes; thus, the grouping may be logical and not physical. With this type of attribute matching, the grouping takes the form of a logical group versus a physical group and can be characterized also as a sub-population or population. The attribute grouping could also be paired with a physical grouping such that end users can be both logically and physically grouped to form a multicast sub-population.

The grouping process, be it geographic-, attribute-, or combinatorially-based, is accomplished via methods well understood in the art. To realize geographic grouping, the GPS position can be mapped to a given radii, and all end users within that radii are grouped. For attribute grouping, the end user or subscriber attributes are stored in a database such as a Home Location Register (HLR) if the wireless network is cellular; then all end users with the requisite attributes are logically joined as a group independent of their physical location. Alternatively, both "grouping" methods, geographic and logical attribute, are combined to provide highly targeted delivery, both by location and by needs. Other grouping methodologies are possible, and nothing herein limits how groups are formed. The groups that are defined are used by content routing and formatting element 145 shown on FIG. 1B to activate the network to deliver a particular stream of content to the grouped end user devices and in a format that matches their particular display and function characteristics.

The Virtual Aggregation Processor of the Forward Path Multi-Media Management System 118 has three building blocks: Virtual Feedback Aggregator 120 acts as a communication device and buffer to collect and aggregate all of the reverse path information; Content Processor 130 acts as an information processor where software applications reside and process various inputs from the connected end user devices; and Content Integrator 140 performs the functionality of modifying the selected multi-media content stream. The modification by Content Integrator 140 could be a video frame processor, it could be an audio stream modifier, or it could be both, for example.

Content Processor 130 has algorithms to determine how N reverse path modifier inputs should be collectively assimilated and then sent to Content Integrator 140 for content modification. Content Processor 130 determines how to apply the collective inputs for a given processing step performed in Content Integrator 140. There is at least one resident software application and there could be multiple software applications concurrently operating. The input includes, but is not limited to: what region an end user device is in (useful for forming the forward path multicast region); what sensor data is the device sending, such as HazMat information; what the GPS location is of a given device; is there a "user input" such as an action or motion for a gaming application; and so on.

Reverse path 170 originating in FIG. 1B and connected to Forward Path Multi-Media Management System 118 and internally to Virtual Feedback Aggregator 120 provides a method where end user devices in groupings 160, 161, 162, and 163 communicate data for the modification procedure that ultimately occurs at Content Integrator 140. This completes a continuous processing cycle end-to-end across the Forward Path Multi-media Management System 118.

The Forward Path Multi-Media Management System 118 enables the functions of aggregation of reverse path content at Virtual Feedback Aggregator 120. The reverse path content conveyed from content sources 105-108 is comprised of content that is multi-media in nature where the content sources 105-108 are uploading raw content to the Content Integrator 140 of the Forward Path Multi-media Management System 118.

It is anticipated that the preferred embodiment of the Forward Path Multi-media Management System 118 has a feedback loop comprising reverse path 170 as the content modification data link, and paths 110, 111, 112, and 113 are used primarily for content source paths. In addition, the forward path components 110A-113A, where links 110-114 are bidirectional links, are shown as directly connected to the content sources 105-108 to illustrate how the forward path multi-media content can be modified directly at the content generating content sources 105-108. In this architecture, the content sources 105-108 embody a content processing capability similar to the Virtual Aggregation Processor.

The applications illustrated in the Forward Path Multi-Media Management System 118 are for illustration, and multi-player application 141 is a gaming process that implements multi-player gaming or live multi-party interactive competitions. Morphing Area process 142 uses the received reverse path feedback data to map a geographical locus and region of a physical phenomenon that is detected by a plurality of the end user devices, such as the presence of a BioHazard. Education application 143 represents an education application where a student or students can ask professors questions of a live multicasted classroom lecture. Personal Medicine application 144 is a multi-party medical feature, such as a support group for cancer. Traffic reporting application 145 uses the feedback received from the end user devices to map road conditions on the various highways that are being traversed by the end users. Blogging application 146 provides the end users with a venue to post blogs. Personal video upload service 147 enables the end users to upload multimedia files for sharing among end users. Social networking application 148 represents any multi-party communication site.

The output of these various services and applications are transmitted to content routing and formatting element 145 for display formatting and routing to end user groups. These outputs then are transmitted via communication path 150 to effect a multicast of the modified content which is transmitted to the end user devices via the forward path 155 of the communication network. Note that forward path 155 can take on many forms, ranging from cellular to MediaFLO to WiMax, and this listing does not limit the inclusion of other means which realizes a simultaneous forward path delivery mode. Forward path 155 connects to end user groupings 160, 161, 163, and to end-user device 162. As an example, grouping 160 contains end user devices 1, 2, and 57 which are unique to Region 1; the forward path to this grouping could be via MediaFLO, for example. In grouping 161, Region N's end user devices 2-10 and 15, 18, and 105 might be connected via forward path 155 as a WiFi architecture. In Region 2, the listed end user devices could be connected via forward path 155 as a DVB-H signal. The Single Device 162 may be in a very remote area, so it uses a mobile satellite to receive forward path 155.

Cellular Network Implementation

FIG. 1C illustrates one embodiment of a physical implementation of the system of FIGS. 1A and 1B. In FIG. 1C, a cellular network is depicted, but other network architectures are capable of realizing Forward Path Multi-Media Management System functionality. Other network types include: MediaFLO, WiFi, WiMax, satellite, Bluetooth, UWB, and so on. Of note, certain cellular building blocks are not shown for concept clarity; the devices not shown include but are not limited to: Home Location Register (HLR), Visitor Location Register (VLR), Mobile Switching Center (MSC), Packet Data Switch Network (PDSN), and so on. The function and interconnection of these devices is well known in the art.

Radio Network Sub-System 182 and Radio Network Sub-System 183 are shown, and these Radio Network Sub-Systems could be CDMA or TDMA for their RF access protocol; they could be 3G or 3.5G in their deployment lifecycle. The frequencies could be 800 MHz or 2 GHz. Each Radio Network Sub-System serves a unique geographic region. Cell site 198 serves end user devices 189 through 190, and cell site 199 serves end user devices 194 through 195.

Cell site 198 could be omni-directional in its coverage extent, while cell site 199 could be sectorized in its coverage. Further, end user devices 189-190 are grouped together because they are receiving a common multicast from Radio Network Sub-System 182 via cell site 198 along RF forward path 186. Likewise, end user devices 194-195 are receiving a common multicast from sectorized cell site 199 via RF forward path 191. However, on the reverse RF path, end user device 189 communicates via RF pathway 187, while end user device 190 communicates on the reverse path via RF pathway 188; and end user device 194 communicates on reverse path 192, while end user device 195 communicates via reverse path 191.

In a process well understood in the art, a mobile device (end user device) could move from sectorized cell site 199 to omni-directional cell site 198 and retain seamless coverage via the hand-off or hand-over process. Hand-offs can be hard, meaning the previous signal is dropped before the new signal is acquired, or they can be soft, where both cell sites 198 and 199 would have communication for a period of time until the hand-off is completed. Separately, within the sectored cell site 199, a "softer" hand-off process can occur wherein the end user device operates on two adjacent coverage sectors of cell site 199 at the same time.

To initiate a forward path modification sequence, a content modification signal is sent across the physical network. Tracing the path of one example reverse path signal, end user device 189 would communicate via reverse path 187 to cell site 198, which then communicates with Radio Network Sub-System 182. End user device 182 then communicates with data switch/router 180 to the network 181. Network 181 contains all the typical networking formats to include Public Telephone Switched Network (PSTN), Public Switched Data Network (PSDN), and an Internet Protocol Network (IP Network). In addition, while not shown, other protocols that are more suited to a mobile architecture, such as IPv6, may be deployed.

The network 181 is connected to end user devices 184 and 185 via a more traditional wired paradigm. Forward Path Multi-Media Management System 175 is connected to network 181 and Forward Path Multi-Media Management System 175 receives reverse path modification information from all the then connected end user devices and processes the data in a manner described herein. The Source Content site 177 delivers content to Forward Path Multi-Media Management System 175; content can be multi-media or any other data form that has relevance to the subscriber population or subpopulation. After the Forward Path Multi-Media Management System has performed its operations, it forwards the modified forward path content back to network 181. Network 181 then communicates to router 180, then radio network subsystem 182 and cell site 198 finally transmit the modified forward path content via RF path 186 to end user devices 189-190, respectively. This process repeats in a cyclical fashion, starting with reverse path modification information to the Forward Path Multi-Media Management System 175, which then modifies the forward path content, on a frame-by-frame basis if video, and then back to the end user devices.

Gaming Representative Architecture

Figure 2:
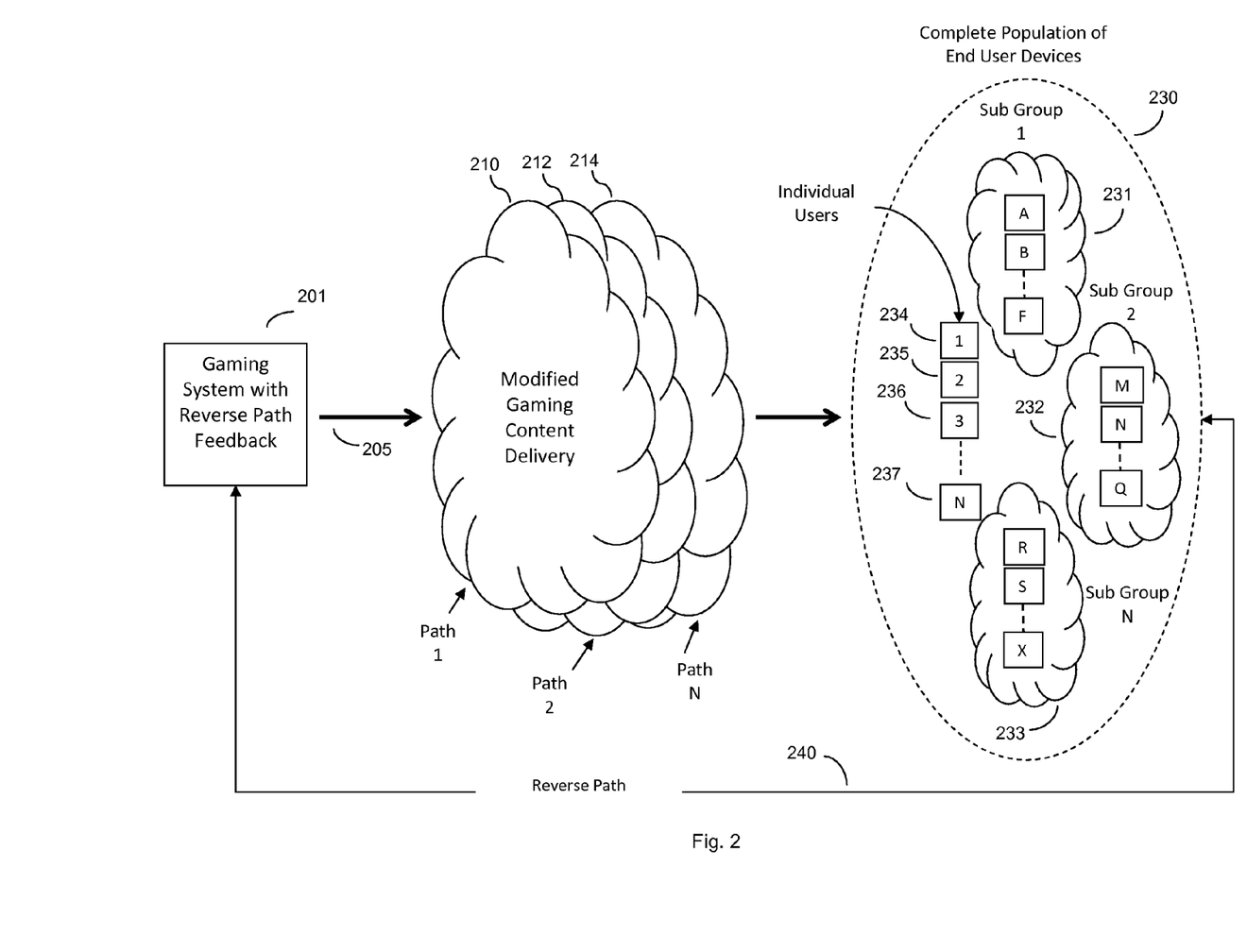
FIG. 2 illustrates the inter-relationship between a series of forward path multicasts and sub-populations of end users with reverse path feedback.

FIG. 2 illustrates, in broad perspective macro block diagram form, how a typical gaming application might be architected. For this description, the card game of blackjack gambling is used; however, nothing in this example description limits the applicability of the described concepts to other applications with similar attributes.

At Forward Path Multi-Media Management System 201, the reverse path feedback data is aggregated from reverse path 240. The data coming into Forward Path Multi-Media Management System 201 originates from end user devices located on the right side of FIG. 2, shown as squares with alpha or number designators. This feedback data could be instructions such as: "I'll take another card" or "I want to double down" or "I fold and am out for this game only" or "I am done playing entirely". For blackjack, the "dealer" is a software application residing as an external network connected device 202, called Application. This software application 202 responds to the feedback data collected by Forward Path Multi-Media Management System 201 and then creates and provides modified content via connection 205 to forward paths 210, 212, and 214. Likewise, any other application, be it multi-player gaming or the like, would operate in a similar fashion.

Nothing herein limits what form forward paths 1, 2, and N, respectively 210, 212, and 214, take. Thus, forward path 210 could be WiFi, forward path 212 could be MediaFLO, and forward path 214 could be cellular, each of which comprise an air interface for the forward path. Forward paths 210, 212, and 214 can also be characterized as a physical delivery region, or could be characterized as a combined physical and logical delivery region/method, respectively, or just a logical delivery method. If forward paths 210, 212, and 214 are logical delivery paths, then the delivery methodology is related to pairing of end users with a given forward path's content, where the end users have like interests independent of physical location. The actual physical delivery regions of these forward paths could be highly varied and diverse. For example, forward path 210 may just be a single narrowcast to a neighborhood in a city on a Caribbean island where electronic gambling is legal. In contrast, forward path 212 could be to all the major gambling areas in the world to include, but not be limited to: Las Vegas, Atlantic City, river boats on the Mississippi, cruise ships on the ocean, casinos on tribal lands, the French Riviera, Monaco, and so on. For forward path 212, since it is covering so many diverse geographic regions, the air interface of the forward path, be it WiFi, DVB-H, or MediaFLO, can vary, and nothing herein limits what method is used to deliver the reverse path modified content on the forward path. Finally, forward path 214 might be to all college campuses in the state of Nevada that have more than 2000 students.

The modified forward path content is sent via connection 220 which, as already discussed, could take the form of a variety of wireless air interfaces. The Population 230 comprises the complete set of then connected Players or End Users and their associated End User Devices. Within this Population 230 of the then connected end user devices, Sub-Populations 231-233 are present. These Sub-Populations 231-233 may be geographically concentrated to enable an efficient forward path multicast, narrowcast, or broadcast delivery; or these Sub-Populations 231-233 may be defined as the set of all Players or End users that are blackjack aficionados (i.e., a logical grouping). Again, this latter description is more logical in its extent. Thus, Sub-Populations 231-233 may be logically based on demographics, for example, physically based on location, or the Sub-Populations 231-233 could be a combination of each "grouping methodology". For instance, in Sub-Population 231, end user devices A and B may be in the same geographic region as end user devices M and N in Sub-Population 232, and so a single physical air interface narrowcast (WiMax, for example) is set up to deliver the modified forward path content to end user devices A, B, M, and N, since they are geographically close or in some air interface proximity to each other and within the coverage region of the WiMax cell.

Alternatively, Sub-Populations 231-233 could all be geographically defined and the logical grouping of those end users interested in blackjack has already been defined by the system. In this case, three multicasts would be set up to deliver modified forward path content to these three geographic regions. Individual Users having end user devices 234, 235, 236, and 237, the Nth device, would each have their own physical air interface connection to the modified forward path content.

In aggregate, the entire Set or Population 230, in some pre-specified timeframe, provides feedback via reverse path 240 to Gaming System With Reverse Path Feedback 201, all in a continuous fashion until a given blackjack game is complete, when a new game is started, or when the scheduled time for blackjack is over, for example.

Reverse Packet Timing

For most applications, it is important to time align the reverse path packet set comprising packet streams from end user devices 1 to N. This is true for a HazMat event where aggregated reverse path data must be time synchronized to some acceptable window of error. Without such synchronization, the data sent out via shared multicast forward path could be in incorrect and actually cause additional harm or loss of life. In other applications, such as gaming, the players' data needs to be aggregated, again within some time window; otherwise, the modified forward path content appears out of context or nonsensical. Packets are typically stored until they can be time sequence ordered within some time window and then forwarded to the delivery networks by an application router. Reverse path packets that arrive outside of the time window for aggregation would be discarded.

Process for Modifying the Forward Path

Figure 3:
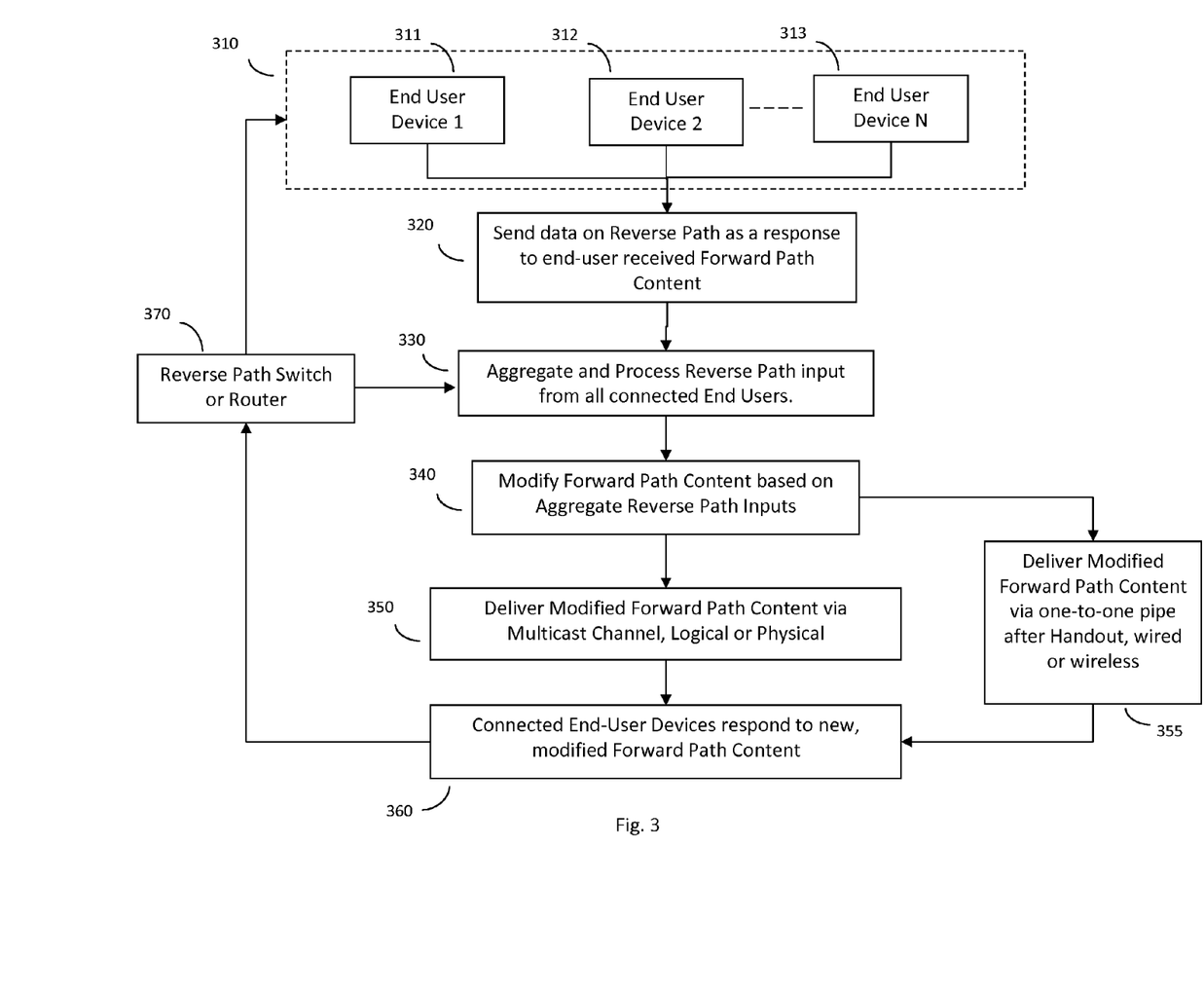
FIG. 3 illustrates, in flow diagram form, the macro process steps that the Forward Path Multi-Media Management System takes to complete a continuous forward path modification cycle.

In FIG. 3, a typical process for modifying the content that is transmitted on the forward path is described. This is merely one of a number of methods to modify the content that is transmitted on the forward path and is not meant to be the only means for such forward path modification.

At step 310, the entire population of then connected end user devices is shown. The Forward Path Multi-Media Management System is not limited to where the end user devices are physically located. End User Device 1 (311), along with End User Device 2 (312) and End User Device "N" (313), respond to the most recent forward path content, such as the display on a hand-held video game, and initiate a reverse path communication via their end user device at step 320, such as how to move their avatar in an action game. At step 330, the Virtual Aggregation Processor receives and processes the reverse path inputs from the then connected end user devices and to insure time coherency in the aggregated responses.

At step 340, the forward path content, still to be delivered back to the connected end user population, is modified. Thus, in this gaming application, the next frame (or number of frames) of the game is modified based on the collectively aggregated reverse path input. At step 350, the game video and audio is delivered via a shared forward path. The delivery can be via physical grouping, logical grouping, or a combination of the two forms of grouping. At step 355, the game video and audio is delivered via a one-to-one communication means, either wired or wireless.

At step 360, the feedback loop starts again where the end users, via their end user devices, begin to respond to the new video and audio being displayed on their end user devices. Step 360 connects to step 330 in a continuous fashion until the game is complete or some other decision for game termination is realized, such as a time or date. In addition, at step 370, the end user feedback can be destined for selected ones of the other players in the multi-player game so a player can team with other players in a personal end user device-to-end user device communication link over the bidirectional links.

SUMMARY

The Forward Path Multi-Media Management System architecture enables end user devices to share a common wireless forward path of a multicast communication architecture in which the forward path delivered content is dynamically changed or modified based on a real-time, near-real-time, or delay-time basis via aggregated reverse path feedback from at least one of a plurality of end user devices. The Virtual Aggregation Processor periodically or continuously aggregates the feedback input received via the reverse path (having wired and/or wireless connectivity), modifies the forward path multi-media content, and delivers this dynamically modified multi-media content to the then connected population of end user devices via a wireless forward path multicast in a repetitive closed loop fashion.

The invention claimed is:

1. A virtual aggregation processor system, comprising:
    a content integrator for receiving multi-media content from at least one multi-media content source;
    a unidirectional wireless forward broadcast path, connected to and shared by a plurality of wireless end user devices, for concurrently transmitting multi-media content from the content integrator to the plurality of wireless end user devices;
    a plurality of wireless private reverse communication paths, each separate from the unidirectional wireless forward broadcast path and unique to each of the plurality of wireless end user devices, for transmitting end user content modification data from each of the plurality of wireless end user devices;
    a virtual feedback aggregator for collecting content modification data received over the plurality of wireless private reverse communication paths from the plurality of wireless end user devices;
    a content processor assimilating the collected content modification data; and
    wherein the content integrator is connected to the content processor and dynamically modifies the multi-media content based on the assimilated aggregated content modification data received from the plurality of wireless end user devices.

2. The virtual aggregation processor system of claim 1 wherein said content processor associates the content modification data received from the wireless end user devices with a corresponding multi-media content.

3. The virtual aggregation processor system of claim 2 wherein the multi-media content comprises a series of frames that are delivered in sequence, and the content processor further comprises:
    a timing process for defining a time period for use by the content processor during which time period the content modification data is associated with a present frame in the series of frames.

4. The virtual aggregation processor system of claim 3 wherein the content processor further comprises:
    an accumulated data processor for processing the accumulated content modification data to a composite content revision for a multi-media content.

5. The virtual aggregation processor system of claim 4 wherein the content integrator further comprises:
    at least one integration application, responsive to receipt of the accumulated content modification data, for revising the multi-media content to produce a revised multi-media content.

6. A method of operating a virtual aggregation processor system, comprising:
    receiving multi-media content from at least one multi-media content source;
    wirelessly transmitting multi-media content over a unidirectional wireless forward broadcast path, connected to and shared by a plurality of wireless end user devices, concurrently to a plurality of wireless end user devices;
    transmitting end user content modification data from each of the plurality of wireless end user devices over a plurality of wireless private reverse communication paths, each separate from the unidirectional wireless forward broadcast path and unique to each of the plurality of wireless end user devices;
    collecting content modification data received over the plurality of wireless private reverse communication paths from the plurality of wireless end user devices;
    assimilating the collected content modification data; and
    dynamically modifying the multi-media content based on the assimilated aggregated content modification data received from selected wireless end user devices.

7. The method of claim 6 wherein said step of modifying comprises:
    revising, in response to receipt of the accumulated content modification data, the multi-media content to produce a revised multi-media content.

8. The method of claim 6 wherein the multi-media content comprises a series of frames that are delivered in sequence, and the step of assimilating comprises:
    defining a time period for use by the content processor during which time period the content modification data is associated with a present frame in the series of frames.

9. The method of claim 8 wherein the step of assimilating comprises:
    processing the accumulated content modification data to a composite content revision for a multi-media content.

10. The method of claim 9 wherein the step of modifying comprises:
    revising, in response to receipt of accumulated content modification data, the multi-media content to produce a revised multi-media content.

* * * * *